Nov. 24, 1925. 1,563,254
C. L. CORNE
BRUSH PAN
Filed June 17, 1925 2 Sheets-Sheet 1
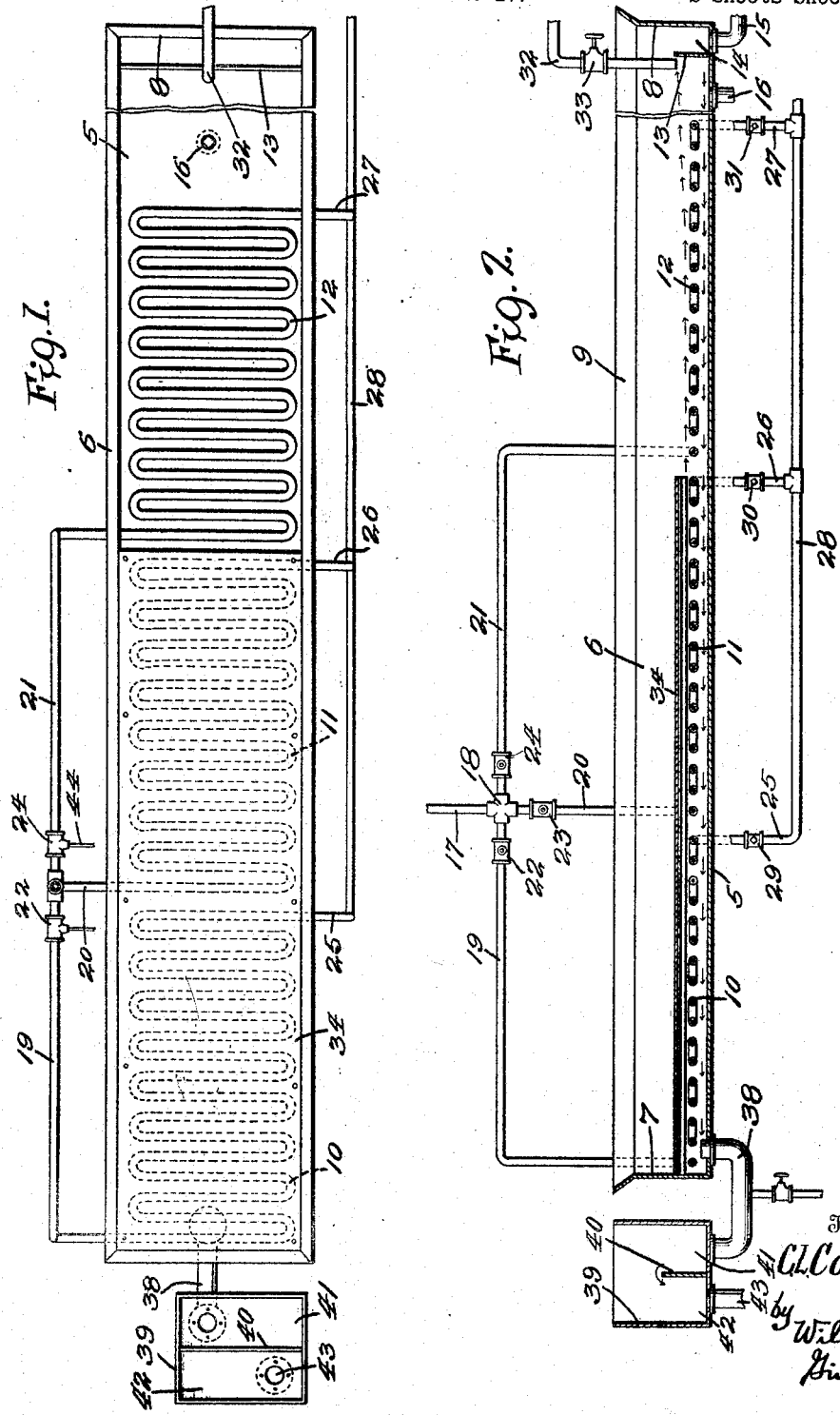

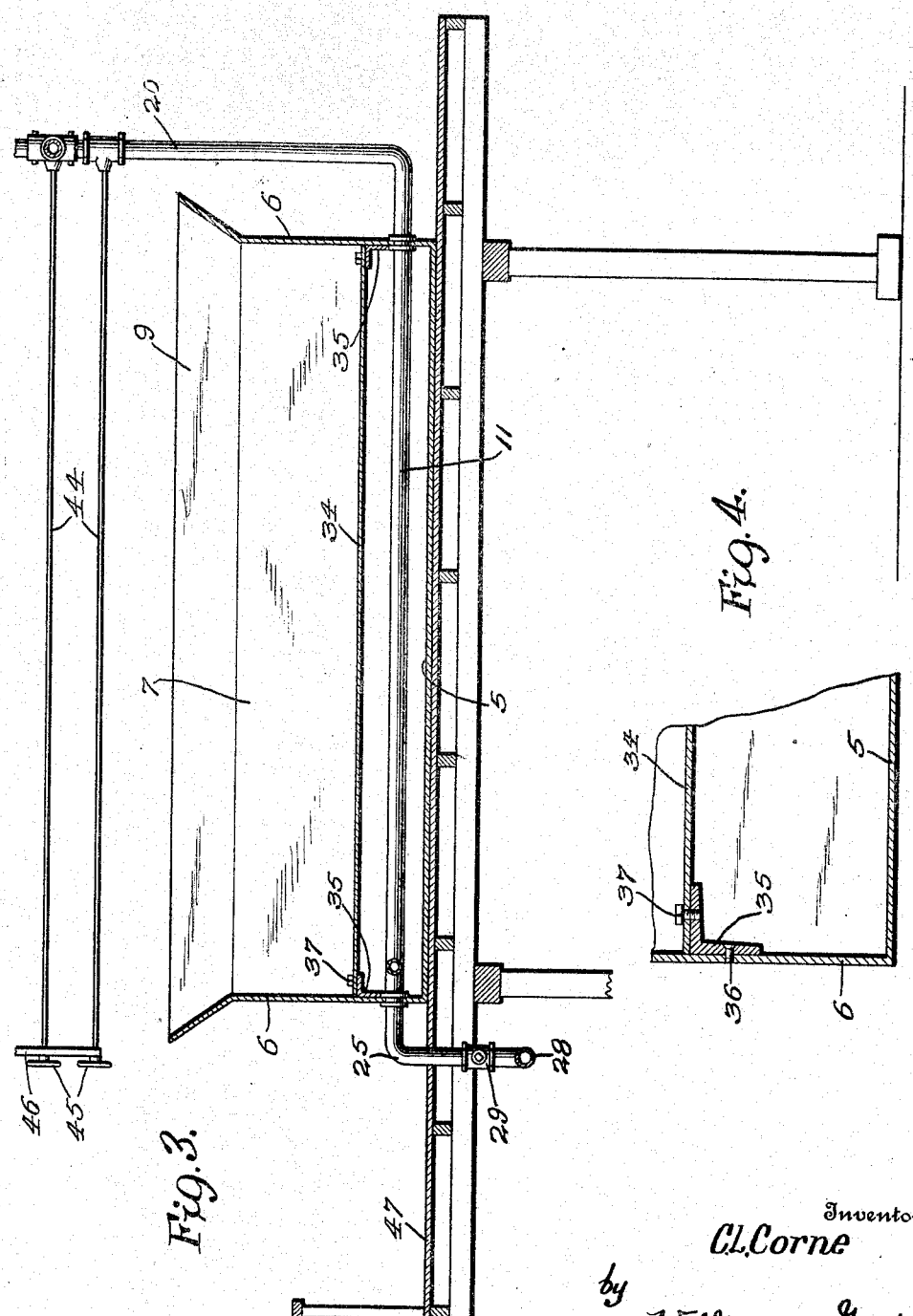

Patented Nov. 24, 1925.

1,563,254

UNITED STATES PATENT OFFICE.

CHARLES LOUIS CORNE, OF BROUSSARD, LOUISIANA.

BRUSH PAN.

Application filed June 17, 1925. Serial No. 37,783.

*To all whom it may concern:*

Be it known that I, CHARLES LOUIS CORNE, a citizen of the United States, residing at Broussard, in the parish of Lafayette and State of Louisiana, have invented certain new and useful Improvements in Brush Pans; and I do hereby declare the following to be a full, clear, and exact description of the invention, such as will enable others skilled in the art to which it appertains to make and use the same.

The present invention relates to improvements in brush pans and refers more particularly to a combined brush and evaporating pan useful for removing impurities from cane and other juices.

It is an object of the invention to provide an improved pan which will subject the juices to progressive degrees of temperature therein and in which the construction of the pan, combined with this progressive heating will separate out the impurities and permit of the skimming off of the impurities at the cold end of the pan, without loss of the pure juice, while permitting of subjecting such juice to violent ebullition at a remote end of the pan.

The invention has for a further object to provide a pan in which independent heating units are provided in which to subject the juice to progressive heating, with controls for the heat units assembled for convenient operation at the working side of the pan; and to provide in the pan a cover for the separation of the frothy material; while also to provide in conjunction with the pan and cooperation with said cover, an open tank for the regulation of the height of the liquor in said pan.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view with a portion broken of an improved brush pan constructed according to the present invention.

Figure 2 is a longitudinal section taken therethrough.

Figure 3 is a cross section taken through the pan and showing the control apparatus, and Figure 4 is an enlarged fragmentary section showing a detail.

Referring more particularly to the drawings 5 designates the bottom of the pan having the side walls 6 and the end walls 7 and 8; said side and end walls having the upper outwardly flaring flanges 9. The pan is relatively shallow but is quite long as compared with its width. I have found that a pan measuring sixty feet (60') in length and six feet (6') in width will give excellent results. In the pan are placed heating coils 10, 11 and 12, preferably three in number and with the coils thereof preferably extending in the same plane slightly spaced above and parallel with the bottom 5 of the pan to permit of a space beneath the coils for the circulation of the juices from the cold to the hot end of the pan as indicated by the arrows in Figure 2. The coil 10 is placed close to the hot end of the pan adjacent the end wall 7; while the last coil 12 in order being remote from the cold end of the pan at which is placed the overflow weir 13 transversely of the pan and spaced from the end wall 8 whereby to form with said wall a trough 14 into which the scum and impurities which rise to the surface of the liquid may be discharged. At the bottom of the trough is a discharge pipe 15. The tank is provided with the wash out plug 16 at a convenient place in its bottom wall preferably adjacent, though not obscured by the coil 12. The coils are supplied with steam or other suitable heating medium from the general supply pipe or trunk 17 which connects through the coupling 18 with the branch pipes 19, 20 and 21 leading to the several coils 10, 11 and 12. Valves 22, 23 and 24 are disposed in the branch pipes for independently controlling the heating medium to such coils. The branch pipes preferably enter the brush pan at one side, while the discharge pipes 25, 26 and 27 lead off from the opposite side of the pan to the common tail pipe 28 by which the heating medium and water of condensation may be conveyed away or returned to the source. Check valves 29, 30 and 31 are provided in the take off pipes 25, 26 and 27 for preventing back flow from the tail pipe into the coils.

The juice is let in to the pan at the cold end through the charge pipe 32 having the control valve 33. In the pan is disposed the cover plate 34 arranged at the hot end of the pan and supported upon the angle bars 35 shown more particularly in Figures 3 and 4. The angle bars are secured as by the screws 36 to the side walls 6 of the tank, while the cover rests upon the horizontal flanges of the angle bars and is removably secured thereto as by the screws 37 or other fastenings. The cover plate 34 extends above and substantially parallel with the first two heating coils 10 and 11 and is spaced slightly above these heating coils to provide a channel for the passage of the heated juices which ascend beneath this cover plate and tend to return to the cold end as indicated by the arrows in Figure 2. The cover plate 34 also confines the greater heat given off by the coils 10 and 11 and creates a condition of violent ebullition in the highly heated juice beneath such plate. The clear juices are carried off by the pipe 38 at the hot end of the pan to a tank 39 having a central partition 40 therein dividing such tank into the compartments 41 and 42. The pipe 38 communicates with the bottom of the compartment 41 and the juice is intended to flow over the upper edge of the partition and into the compartment 42 whence the liquor is taken off by the discharge pipe 43 to the effects or other apparatus. The height of the partition 40 will regulate the height of juice in the brush pan. The top of the tank 39 is left open.

Referring to Figure 3 it will be seen that the stems 44 of the several valves 22, 23 and 24 for controlling the inlet of steam to the heating coils are drawn forward across the top of the brush pan and are provided with the hand wheels 45 mounted in a suitable support 46 where they will be convenient to the hand of the operator upon the floor 47 at the working side of the pan.

In the use of the device through the control of the valves 22, 23 and 24, a progressive heating of the juice in the brush pan will be brought about. The heating medium will be introduced into the first coil 10 in such volume and at such temperature as to create a condition of boiling in the juices at this hot end of the pan, while a lesser amount of heating medium will be let into the second coil 11, so as to maintain a highly heated condition in the juice throughout the length of this second coil but at a lower degree than that maintained at the first coil and a still lesser degree of heat will be given off by the third coil through the control of its valve 24. The juice is thus subjected to a scale of temperatures. While the pan may be of any dimensions desired, where the pan is sixty feet (60') long as above referred to, the cover plate 34 is twelve feet (12') in length and covers the coils 10 and 11. This cover plate 34 subserves several functions. For instance it will direct the flow of the foam to the mud end or the cold end of the pan. It also causes the juice to break up in a sort of cascade where it discharges from under the plate. The plate moreover confines a great portion of the liquor and juice at the boiling end and conserves the heat and forms a condition of violent ebullition which is necessary to separate out the impurities. With the use of this plate the efficiency of the pan is increased substantially fifty percent. The juice is charged in through the pipe 32 and the action of the pan is continuous. The cold juice will flow along the bottom of the pan beneath the heating coils to the hot end of the pan where it is violently heated, rises and passes back along the under side of the plate 34 issuing violently and turbulently from beneath the end of this plate whereby to cause the impurities to froth and to run toward the cold end of the pan where they may be skimmed off into the trough 14 and conveyed to the wash out 15. The juice will then be returned to the covered end of the pan along the bottom thereof and this circulation of the juice may be continued as long as is necessary to remove all of the impurities. The pure juice passes out at the hot end of the pan through the pipe 38 as heretofore referred to. The clear juice goes to the effect tanks when the brush pan is used for cleaning juice for making sugar or to evaporators when making syrup. In other words the machine may be used for making syrup or for cleaning juice for making sugar.

It will be noted that the pipe 38 passes through the bottom of the pan and has its open end disposed at an elevation above said bottom. The cold juice comes in at the cold end of the pan approximately sixty feet (60') from the hot end, but, while there is more steam turned in the coil 10 at hot end, both coils 11 and 12 are also at boiling temperature. In other words over two-thirds of the pan is maintained at boiling temperature. When the cold juice reaches the coil 12 it will rapidly attain the boiling point and it will be kept at this high temperature until circulating to the hot end of the pan and returning again to the cold end of the pan. Of course all of the juice at the coil portion of the pan will be kept in a boiling, seething condition. Consequently no cold juice can find its way to the outlet pipe 38 and such juice as passes immediately out of this pipe 38 after a single traverse of the pan will be subjected in its course in an adequate heat treatment to remove the impurities. Of course on account of the boiling action the juice will not circulate as indicated by the arrows in an unbroken current, but the arrows simply show the general trend of the juices. The brush pan takes out the impurities in solution, it being understood that prior to entry of the pan the juice has been as thoroughly cleaned as prior existing methods permit. The settlers take out the solid matters and the brush pan takes out the impurities that cannot be seen. The brush pan is used for making syrup or for sugar making.

It is found in the practical use of the pan that soluble impurities that could not be removed with a filter are separated out from the juices and that surprisingly great quantities of impurities are removed in the improved brush pan leaving a syrup or juice that is unequaled for its cleanliness and uniformity of color.

It is obvious, that various changes and modifications may be made in the details of construction and design of the above specifically described embodiment of this invention without departing from the spirit thereof, such changes and modifications being restricted only by the scope of the following claims.

What is claimed is:—

1. A brush pan comprising a pan body of elongated and substantially narrow construction with a cold and a hot end, a discharge for the impurities at the cold end and a discharge for the pure juice at the hot end of the pan, means for charging the tank at the cold end thereof, and a series of heating units in the hot end of the pan having separate controls whereby the juice is subjected to progressively decreasing ranges of temperature from the hot toward the cold end of the pan, with a cover plate located above the heating units adjacent to the hot end.

2. A brush pan comprising a pan body having a hot and cold end with a discharge for the pure juice at the hot end and a discharge for the impurities at the cold end, a series of heating units at the hot end of the pan, controls whereby said heating units may be caused to subject the juice to progressively decreasing ranges of temperature from the hot toward the cold end of the pan, and a cover plate over a portion of the hot end of the pan.

3. A brush pan comprising a pan body of elongated construction having remote hot and cold ends with a discharge for the pure juices from the base of the hot end and a discharge for the impurities from the upper portion of the cold end of the pan, means for charging the tank with the juice to be cleaned, a series of heating units in the hot end of the pan, and a cover plate in the hot end of the pan extending over certain of said heating units.

4. A brush pan comprising a shallow, elongated and relatively narrow pan with remote hot and cold ends, a weir at the cold end of the pan for the overflow of impurities, means for introducing charges of juice to be cleaned into the pan, heating units extending from the hot end of the pan for a distance toward the cold end of the pan, and means for carrying off the pure juice from the hot end of the pan with a cover plate located above the heating units adjacent to the hot end.

5. A brush pan comprising an elongated substantially shallow and narrow pan body having remote hot and cold ends with a discharge at its hot end for the pure juices and a discharge at its cold end for the impurities, a charge pipe for introducing the liquor into the tank, a number of heating coils extending from said hot end of the pan toward the cold end thereof, independently controlled means for supplying heating medium to said coils, said coils extending substantially parallel and in spaced relation above the bottom of the pan, and a cover plate removably mounted in said tank and placed in spaced relation above certain of said coils whereby to provide a channel for the passage of juices.

CHARLES LOUIS CORNE.